(12) United States Patent
Khermosh et al.

(10) Patent No.: US 8,406,620 B2
(45) Date of Patent: Mar. 26, 2013

(54) PASSIVE OPTICAL NETWORK (PON) IN-BAND OPTICAL TIME DOMAIN REFLECTOMETER (OTDR)

(75) Inventors: Lior Khermosh, Givataim (IL); Christopher Michael Look, Pleasanton, CA (US); Tiberiu Galambos, Biniamina (IL)

(73) Assignee: PMC Sierra Israel Ltd., Herzlia Pituach (IL)

( * ) Notice: Subject to any disclaimer, the term of this patent is extended or adjusted under 35 U.S.C. 154(b) by 318 days.

(21) Appl. No.: 12/832,087

(22) Filed: Jul. 8, 2010

(65) Prior Publication Data

US 2011/0013904 A1 Jan. 20, 2011

Related U.S. Application Data

(60) Provisional application No. 61/225,572, filed on Jul. 15, 2009.

(51) Int. Cl.
*H04B 10/08* (2006.01)

(52) U.S. Cl. .................. 398/16; 398/9; 398/13; 398/17; 398/20; 398/21; 398/25; 398/58; 398/63

(58) Field of Classification Search ................ 398/9–24, 398/58–79
See application file for complete search history.

(56) References Cited

U.S. PATENT DOCUMENTS

| | | | |
|---|---|---|---|
| 2004/0070750 A1* | 4/2004 | Iannelli et al. | 356/73.1 |
| 2005/0201761 A1* | 9/2005 | Bartur et al. | 398/197 |
| 2006/0007426 A1* | 1/2006 | Weller | 356/73.1 |
| 2006/0051088 A1* | 3/2006 | Lee et al. | 398/31 |
| 2006/0198634 A1 | 9/2006 | Ofalt et al. | |
| 2007/0103670 A1* | 5/2007 | Sezerman et al. | 356/73.1 |
| 2007/0116467 A1 | 5/2007 | Kwon et al. | |
| 2008/0292314 A1* | 11/2008 | Lu | 398/58 |
| 2009/0016714 A1* | 1/2009 | Soto et al. | 398/20 |
| 2009/0047013 A1* | 2/2009 | Effenberger | 398/16 |
| 2009/0092388 A1* | 4/2009 | Yang | 398/13 |
| 2010/0098413 A1* | 4/2010 | Li et al. | 398/38 |

OTHER PUBLICATIONS

ITU-T G.,Telecommunication Standardization Sector of ITU, G.984.2, Series G: Transmission Systems and Media,Digital Systems and Networks, Digital sections and digital line system—Optical line systems for local and access networks,Gigabit-capable Passive Optical Networks,(GPON): Physical Media Dependent (PMD) layer specification, (Mar. 2003), pp. 1-29.

(Continued)

*Primary Examiner* — Li Liu
(74) *Attorney, Agent, or Firm* — Mark M. Friedman

(57) ABSTRACT

An in-band OTDR uses a network's communication protocols to perform OTDR testing on a link. Because the OTDR signal (probe pulse) is handled like a data signal, the time required for OTDR testing is typically about the same as the time required for other global network events, and is not considered an interruption of service to users. A network equipment includes an optical time domain reflectometry (OTDR) transmitter and receiver, each operationally connected to a link to transmit and receive, respectively, an OTDR signal. When an OTDR is to be performed, a network device operationally connected to the link actuates the OTDR transmitter to transmit the OTDR signal on the link during a determined test time based on a communications protocol of the link, during which data signals are not transmitted to the network equipment. A processing system processes the OTDR signal to provide OTDR test results.

50 Claims, 8 Drawing Sheets

OTHER PUBLICATIONS

IEEE Std 802.3ah-2004, IEEE Standard for Information technology Telecommunications and information exchange between systems Local and metropolitan area network Specific requirements, Part 3: Carrier Sense Multiple Access with Collision Detection (CSMA/CD) Access Method and Physical Layer Specifications, Amendment: Media Access Control Parameters, Physical Layers, and Management Parameters for Subscriber Access Networks, 7.

"Gigibit-capable Passive Optical Networks (G-PON): General characteristics" International Telecommunications Union' G.984.1 Mar. 2003, pp. 1-33.

"Gigibit-capable Passive Optical Networks (G-PON): Physical media Development (PMD) layer specification" International Telecommunications Union ' G.984.3 Mar. 2003, pp. 1-107.

IEEE Standard for Information technology—Telecommunications and information exchange between systems—Local and metropolitan area networks—Specific requirements, Part 3: Carrier Sence Muliple Access With Collision Detection (CSMA/CD) Access Method and Physical Layer Specifications, IEEE STD 802.av, Oct. 30, 2009, pp. 1-214.

TU-T G.,Telecommunication Standardization Sector of ITU, G.984. 4,Series G: Transmission Systems and Media,Digital Systems and Networks,Digital sections and digital line system—Optical line systems for local and access networks, Gigabit-capable Passive Optical Networks,(G-PON): ONT management and control interface specification,(Feb. 2008),pp. 1-421.

G.987.2 : 10-Gigabit-capable passive optical networks (XG-PON): Physical media dependent (PMD) layer specification.

ITU-TG.987.3 : 10-Gigabit-capable passive optical networks (XG-PON): Transmission convergence (TC) layer specification.

ITU-TG.988 : ONU management and control interface (OMCI) specification.

* cited by examiner

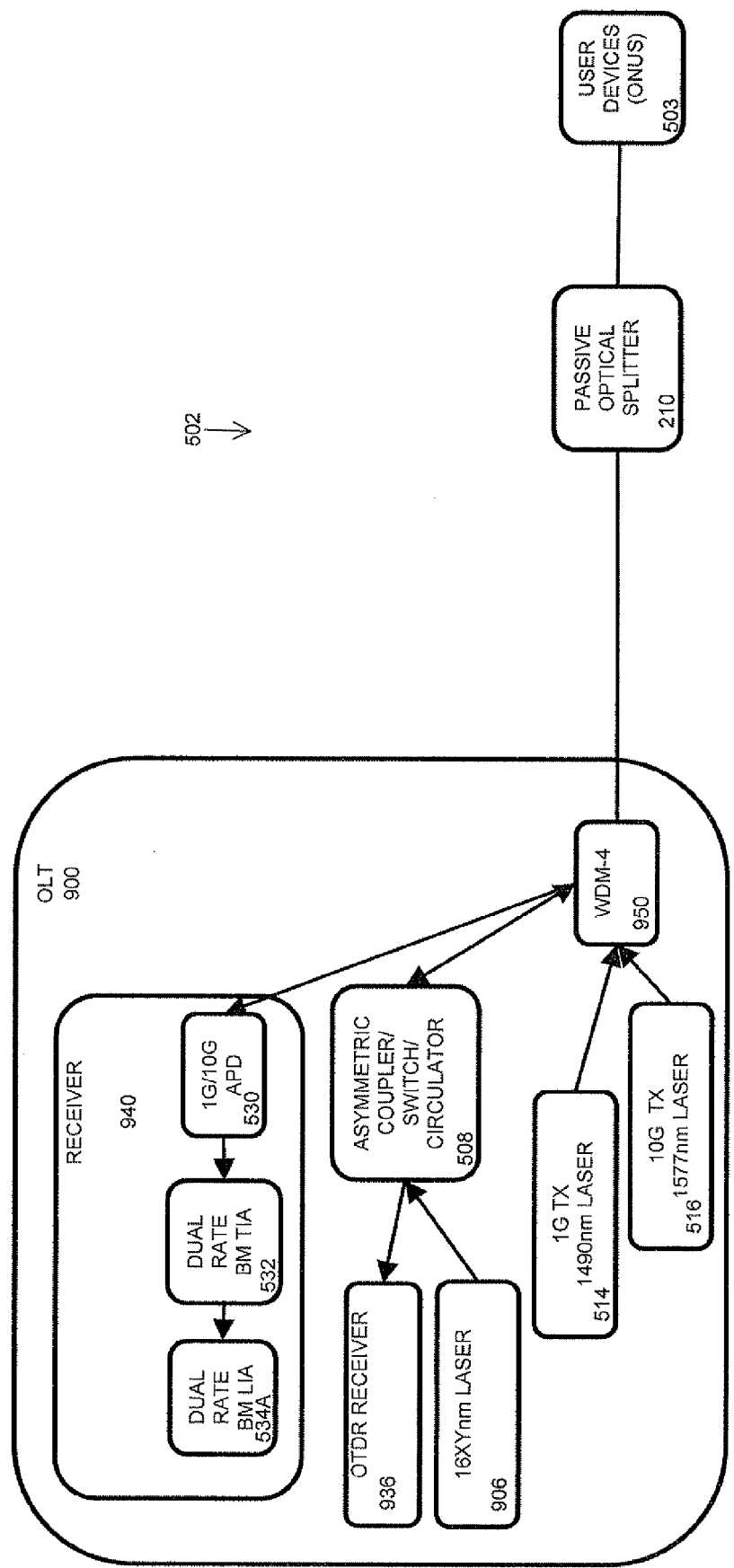

PASSIVE OPTICAL NETWORK (PON) IN-BAND OPTICAL TIME DOMAIN REFLECTOMETER (OTDR)

CROSS-REFERENCE TO RELATED APPLICATIONS

This application claims the benefit of provisional patent application (PPA) Ser. No. 61/225,572 filed on Jul. 15, 2009 by the present inventors, which is incorporated by reference.

FIELD OF THE INVENTION

The present embodiment generally relates to sensing, and in particular, it concerns a system and method for optical time domain reflectometry in a passive optical network.

BACKGROUND OF THE INVENTION

An Optical Time Domain Reflectometer (OTDR) is a very important tool (or "function") for characterization and diagnosis of optical links. The general concept of optical time domain reflectometry (also referred with the abbreviation OTDR), is to transmit an optical pulse into an optical link and measure a reflected signal from the link as a function of time. An optical pulse is more specifically known as a probe pulse, and also referred to as a pulse or an OTDR signal. In the context of this document, an optical link is generally an optical fiber communications link, simply referred to as a link. A reflected signal is also known as a returned or received signal, and in the context of this document, the three terms are used interchangeably, unless noted otherwise. Analysis of the reflected signal allows the physical properties of the link including the properties of the optical fiber, (generally referred to simply as the fiber) to be calculated. FIG. 1 shows an example of an OTDR diagram of the power of a returned signal over time. The physical properties of a link are shown in a diagram of the returned pulse as areas where the slope of the returned pulse is not smooth, and are known as "events". The slope of the line 100 is two times the fiber loss per kilometer. The received optical signal (Rayleigh backscatter signal) is about 45 dB down from a launched 1 usec pulse. Examples of events on the link include, but are not limited to, bad splices 102, bends in the fiber (with too small a radius) 104, and flattened fiber 106. Section 108 shows an example that includes an angled fiber, low reflectance termination, or cut fiber.

The returned signal is derived from components including:

A. A Rayleigh backscattered signal, which arises from random scattering points distributed along the fiber. The returned signal, known as a backscattered signal, is the result of summation of a large number of tiny reflections generated along the length of the optical pulse. In a non-limiting example, if the probe pulse is 1 nsec (one nanosecond) in duration, the amount of fiber 'lit' by the pulse is 1/1,000 the amount of fiber lit by a pulse 1 usec (one microsecond) in duration. In this example, the return backscattered signal of a 1 nsec pulse is 30 dB down compared to a 1 usec pulse. Because the reflected signal equivalent to the pulse size is equal to a shorter length of fiber, a 1 nsec pulse enables higher spatial resolution of the optical fiber, facilitating greater accuracy (less uncertainty) of exactly where in the fiber the event occurs. In the current example, where a 1 usec pulse can provide a resolution of about 100 m (meters), a 1 nsec pulse can provide a resolution of about 0.1 m. For this reason, usually OTDR scans initially start with long pulse to quickly determine the general area of an event on the fiber, and then the scan 'zooms' in with a shorter pulse on specific events as required.

B. Reflections from discontinuities in the refractive index of the link, including, but not limited to splices, connectors, splitters, and fiber end faces. Reflections from these discontinuities have different characteristics than Rayleigh backscattering. For example, the amplitude of the reflected pulse is generally much larger than a backscattered signal and typically localized in a physical extent much shorter than the length of the optical pulse in the fiber. The reflected signal power is dependent on the power of the incident signal and the reflectance of the discontinuity (event) on the link that caused the reflection.

The OTDR function is an important tool to be used in Passive Optical Networks (PON). If a PON is used to provide the physical basis for a reliable communication network, the condition of the network and the installation should be accompanied with diagnostic tools ensuring this reliability. PON networks typically have long distances of optical fiber links (up to the order of tens of kilometers). The fiber links can be in rural areas, and are often buried, making locate failures or degradations of this physical plant a hard task. An OTDR function can be very important in locating points of failure in the link and understanding causes of degradation in the link.

An OTDR tool is used in PONs during the fiber installation to check the quality of the fiber, splices, and couplers, prior to, and during, the Optical Network Unit (ONU) installation (bring-up). OTDR tools can also be used during normal operation to confirm physical connectivity, to identify high loss fiber bends (such as due to physical damage, stress, or time degradation), detecting in-service degraded or failed ONUs, or to identify where fiber to ONU(s) has high loss prior to sending repair personnel. OTDR can also be used to detect out of service conditions (no communication with any/part ONU) and to identify where fiber has failed (cut or high bend loss).

Implementing OTDR in PONs is challenging for conventional OTDR test equipment. The PON as an optical network is generally characterized by a long fiber, an increased link budget due to the long fiber, and optical splits attenuating the signals. Usually the PON has a major splitting point (such as 1:8, 1:16, or 1:32 splitters being common) with additional minor splitting.

Referring to FIG. 2, a diagram of an EPON network, an OLT (optical line transmission equipment of the network provider) 200 communicates over a fiber optic network link (204, 206A, 206B, 206N) with ONUs (optical networking units associated with a user) (208A, 208B, 208N). A passive optical splitter 210 facilitates the OLT 200 communicating with the ONUs (208A, 208B, 208N). The one or more portions of a link from a splitter in the direction of the ONUs (in the current example, 208A, 208B, and 208N) are also known as "arms" of the link. The ONU 200 facilitates user connectivity, typically via a network switch 220, to a core network 222. A controller 224, also known as a host, can provide functions such as command, control, and monitoring of the PON. PONs are know in the art, and one skilled in the art will be able to choose a configuration of components, including but not limited to stand-alone or integrated, for a specific application.

As a result of the high loss from splitters and the fact that reflected signals see this loss in both forward and backward propagation, the OTDR signals are strongly attenuated, resulting in difficulty in seeing what happens after a split. In one non-limiting example, the optical attenuation (fiber, splitters, connectors, etc.) in each direction can be in the range of 30 dB, for a two-way loss of 60 dB. The reflection at the far end of the point can be −15 dB to −45 dB below the forward propagating OTDR probe signal, which means that a sensitivity level of −75 dBm to −105 dBm is needed at the receiver.

In addition, a PON has an additional complication—a forward propagating probe pulse from an OLT is split by a splitter and sent down all the splitter arms simultaneously. Each arm generates reflected signals back towards the OTDR. However, because the signal and backscatter reflections from all ONUs are combined by the splitter as the signals travel toward the OTDR, seeing small changes from events in one particular splitter arm is presents significant challenges. Even if an event is visible, discerning which arm an event occurs in is typically not possible.

Conventional solutions are divided into two broad categories. The first category of solutions is using stand alone OTDR test equipment. If there is a problem with a link, then the fiber for the link is disconnected from a network equipment, an OTDR test equipment is connected to the fiber in place of the network equipment, and the OTDR test equipment performs a test on the link. In the context of this description, a network equipment includes, but is not limited to network devices and user devices. If the problem with the link is thought to be on a side of the link closer to a network device, the OTDR test equipment can be connected in place of the network device, which in the case of PON is the OLT. If the problem with the link is thought to be on a side of the link closer to a user device, the OTDR test equipment can be connected in place of the user device, which in the case of PON is an ONU. In general, network devices are centrally located equipment providing services to a plurality of user devices, and user devices are equipment located at customer locations providing connectivity to a network device. Connecting an OTDR at different points in a network can be necessary due to the previously described difficulties in analyzing signals that traverse a splitter located between a network device and a user device. In these cases, the service is interrupted to the PON physical infrastructure, meaning that all users will lose service for the duration of the OTDR testing. Users are also referred to as customers, clients, and subscribers, depending on the context. In addition, this test requires an active intervention of a technician to physically facilitate the test. Because the network does not provide service during OTDR testing, the OTDR test equipment can use the same wavelengths used to provide service, referred to in this document as using the data signal transmission wavelength.

A second category of conventional solutions is based on using centralized OTDR test equipment, for example a stand-alone equipment using the 1625 or 1675 nanometer (nm) range, which is common in the industry, and referred to in current standards (such as ITU-T L.66) as maintenance wavelength. In the context of this document, the 1625 nm to 1675 nm range is referred to as 16XY. These wavelengths are used because these wavelengths can be wavelength division multiplex (WDM) separated from the PON wavelengths, and hence does not interfere with the PON services. Because the OTDR operates using different wavelengths than the wavelengths providing service to and from users, this technique is known as out-of-band, and service to the user(s) is not interrupted during OTDR. Industry standard communication wavelengths for providing service to/from a customer include the EPON/G-PON downstream (DS) signal (single fiber system) as specified in ITU-T G.984.2 and IEEE802.3ah as 1480 nm to 1500 nm and that of the EPON/G-PON upstream (US) signal as 1260 nm to 1360 nm. Other wavelengths for providing service to/from a customer include the 10GEPON/XG-PON downstream (DS) signal (single fiber system) as specified in ITU-T G.987.2 and IEEE802.3av as 1575-1580 nm range and that of the 10GEPON/XG-PON upstream (US) signal as 1260-1280 nm range. These downstream and upstream wavelengths are referred to in this document as 15XY and 13XY, respectively.

Current PON communication protocols for 1G (one gigabit per second) line rate include IEEE802.3ah-1GEPON (Gigabit Ethernet PON), FSAN (Full Service Access Network) and ITU-T G.984.1/G.984.2/G.984.3/G.984.4 GPON (Gigabit PON). The IEEE802.3av protocol for 10GEPON (10 Gigabit Ethernet PON) and ITU-T G.987.1/G.987.2/G.987.3/G.988 XGPON (10 Gigabit PON) are also known. The general concept of communication in PONs using the current communication protocols includes broadcasting from an OLT to ONUs using a downstream transmission at a first wavelength, and time division multiplexing (TDM) the upstream transmission from all the ONUs to the OLT using a second wavelength. The communications protocol manages and controls the media access of the different users.

The 1GEPON and 10GEPON control protocols are defined by the Multipoint Control Protocol (MPCP) given in the IEEE802.3ah (clause 64, 65) and IEEE802.3av clause (76, 77). The MPCP is packet based. Major MPCP concepts include time-stamping MPCP packets, sending grant packets in the downstream to indicate upstream transmission slots, sending report packets in the upstream to indicate reported data in queues and auto-discovery and a registration protocol. The GPON transmission control protocol (GTC) is defined in ITU G.984.3 and XGPON is defined in ITU G.987.3, and includes management done through a GTC header provided in a GTC frame.

1GEPON and 10GEPON also include a higher level control protocol, the Operation Administration and Maintenance (OAM) protocol defined in IEEE802.3ah (clause 57). The OAM protocol is also packet based. The GPON and XGPON higher level protocol is implemented by two types of messages—PLOAM messages and OMCI messages—defined in ITU G.984.3 and G984.4 and in ITU G987.3 and G.988 for XGPON.

Next generation access (NGA) protocols include the GPON next generation protocol marked as NGPON1, which includes XGPON1 (10G/2.5G) and XGPON2 (10G/10G).

FIG. 3 shows a conventional out-of-band OTDR system. Typically, OTDR test equipment 300 is stand-alone and expensive. Therefore, the OTDR test equipment is typically a shared resource. Sharing is typically accomplished using the above-described optical switches and WDM optical couplers 302. The OTDR test equipment is connected to a link only when there is a problem to the relevant link. An OTDR signal (probe pulse) 304 is sent from the OTDR 300 via the WDM 302 into the link 204. An OTDR signal (returned signal) 306 is received via the WDM 302 by the OTDR 300. If there is a problem after a splitter and the position is important then OTDR test equipment can be connected at an ONU. For example, OTDR 300 can be brought to the user location and substituted for ONU-1 208A, hence using fiber 206A for testing that arm of the link. In a further extension of this method, some operators add connectorized 16XY nm reflectors, typically fiber bragg grating (FBG) reflectors, at the ONU to reflect back the OTDR signal to allow the different paths from each ONU to be seen. The OTDR test equipment is typically located in a central office (CO) 308 or a nearby facility. Although a single PON is shown, typically the OTDR test equipment is connected to a plurality of PONs via an array of optical fiber switches and optical couplers under the control of a controller. This solution is not widely deployed because of the complexity and cost of this solution.

There is therefore a need for a system to perform analysis of links, including monitoring of links and providing smart alarms, in particular performing OTDR of PONs more frequently, while maintaining service for users, and at a lower cost than conventional solutions.

SUMMARY

According to the teachings of the present embodiment there is provided a system including: a network equipment including: an optical time domain reflectometry (OTDR) transmitter operationally connected to a link and configured to transmit an OTDR signal, and an OTDR receiver operationally connected to the link, configured to receive the OTDR signal; a network device operationally connected to the link, the network device configured to actuate the OTDR transmitter to transmit the OTDR signal on the link during a determined test time, the determined test time based on a communications protocol of the link, wherein during the determined test time data signals are not transmitted to the network equipment, and wherein the network device is allowed to transmit the data signals during the determined test time; and a processing system operationally connected to the OTDR receiver, the processing system being configured to process the OTDR signal to provide OTDR test results.

In an optional embodiment, the network equipment is included in the network device. In another optional embodiment, the network device is an optical line transmission equipment (OLT). In another optional embodiment, the network equipment is included in the OLT and the OTDR transmitter is configured for transmitting downstream a 13XY nm OTDR test signal. In another optional embodiment, the determined test time is calculated based on the link.

In an optional embodiment, the system includes at least one user device operationally connected to the link. In another optional embodiment, the network equipment is included in at least one the at least one user device.

In an optional embodiment, the OTDR test results are transmitted via the link using the data signals. In another optional embodiment, the network equipment is included in the network device and wherein the OTDR test results are transmitted via the link using the OTDR transmitter in the user device and received using the OTDR receiver in the network device. In another optional embodiment, the network equipment is included in the network device and wherein the OTDR test results are transmitted via the link using the OTDR transmitter in the network device and received using the OTDR receiver in the user device.

In an optional embodiment, the test time is calculated based on a round trip time (RTT) between the network device and the at least one user device. In another optional embodiment, the network equipment is included in a stand-alone OTDR test equipment separate from the network device and from the at least one user device. In another optional embodiment, at least one of the at least one user device is configured to notify the network device to actuate the OTDR transmitter to transmit the OTDR signal on the link during the determined test time. In another optional embodiment, at least one of the at least one user device is configured to actuate the OTDR transmitter to transmit the OTDR signal on the link during the determined test time. In another optional embodiment, at least one user device is an optical networking unit (ONU). In another optional embodiment, the network equipment is included in the ONU and the OTDR transmitter configured for transmitting upstream a 15XY nm OTDR test signal.

In an optional embodiment, the link is a fiber optic communications link. In another optional embodiment, the link is configured for a passive optical network (PON). In another optional embodiment, the OTDR signal is an in-band signal.

According to the teachings of the present embodiment there is provided a system including: a network equipment including: an optical time domain reflectometry (OTDR) transmitter operationally connected to a link and configured to transmit an OTDR signal, and an OTDR receiver operationally connected to the link, configured to receive the OTDR signal; a network device operationally connected to the link, the network device configured to actuate the OTDR transmitter to transmit the OTDR signal on the link during a determined test time, the determined test time based on a communications protocol of the link, wherein during the determined test time data signals are not transmitted to the network equipment, and wherein the network device is allowed to transmit the data signals during the determined test time; at least one user device allowed to transmit the data signals during the determined test time, the at least one user device operationally connected to the link; and a processing system operationally connected to the OTDR receiver, the processing system being configured to process the OTDR signal to provide OTDR test results.

According to the teachings of the present embodiment there is provided a method including the steps of: actuating an optical time domain reflectometry (OTDR) transmitter in a network equipment to transmit an OTDR signal during a determined test time on a link operationally connected to the OTDR transmitter, the determined test time based on a communications protocol of the link, wherein during the determined test time data signals are not transmitted to the network equipment, and wherein a network device operationally connected to the link is allowed to transmit the data signals during the determined test time; receiving the OTDR signal with an OTDR receiver in the network equipment, the OTDR receiver operationally connected to the link; and processing the received OTDR signal with a processing system operationally connected to the OTDR receiver to provide OTDR test results.

In an optional embodiment, the network equipment is included in the network device. In another optional embodiment, the network device is an optical line transmission equipment (OLT). In another optional embodiment, the network equipment is included in the OLT and the OTDR transmitter is configured for transmitting downstream a 13XY nm OTDR test signal. In another optional embodiment, the determined test time is calculated based on the link.

In an optional embodiment, the method includes at least one user device operationally connected to the link. In another optional embodiment, the network equipment is included in at least one the at least one user device. In another optional embodiment, the OTDR test results are transmitted via the link using the data signals. In another optional embodiment, the network equipment is included in the network device and wherein the OTDR test results are transmitted via the link using the OTDR transmitter in the user device and received using the OTDR receiver in the network device. In another optional embodiment, the network equipment is included in the network device and wherein the OTDR test results are transmitted via the link using the OTDR transmitter in the network device and received using the OTDR receiver in the user device.

In an optional embodiment, the test time is calculated based on a round trip time (RTT) between the network device and the at least one user device.

In an optional embodiment, the network equipment is included in a stand-alone OTDR test equipment separate from the network device and from the at least one user device. In another optional embodiment, at least one of the at least one user device is configured to notify the network device to actuate the OTDR transmitter to transmit the OTDR signal on the link during the determined test time. In another optional embodiment, at least one of the at least one user device is configured to actuate the OTDR transmitter to transmit the OTDR signal on the link during the determined test time. In another optional embodiment, at least one user device is an optical networking unit (ONU). In another optional embodiment, the network equipment is included in the ONU and the OTDR transmitter configured for transmitting upstream a 15XY nm OTDR test signal.

In an optional embodiment, the link is a fiber optic communications link. In another optional embodiment, the link is configured for a passive optical network (PON). In another optional embodiment, the OTDR signal is an in-band signal.

According to the teachings of the present embodiment there is provided a method including the steps of: actuating an optical time domain reflectometry (OTDR) transmitter in a network equipment to transmit an OTDR signal during a determined test time on a link operationally connected to the OTDR transmitter, the determined test time based on a communications protocol of the link, wherein during the determined test time data signals are not transmitted to the network equipment, and wherein at least one user device is allowed to transmit the data signals during the determined test time, the at least one user device operationally connected to the link; receiving the OTDR signal with an OTDR receiver in the network equipment, the OTDR receiver operationally connected to the link; and processing the received OTDR signal with a processing system operationally connected to the OTDR receiver to provide OTDR test results.

BRIEF DESCRIPTION OF FIGURES

The embodiment is herein described, by way of example only, with reference to the accompanying drawings, wherein:

FIG. 8 is a diagram of an OLT with an integrated out-of-band OTDR.

DETAILED DESCRIPTION

Figure 1:
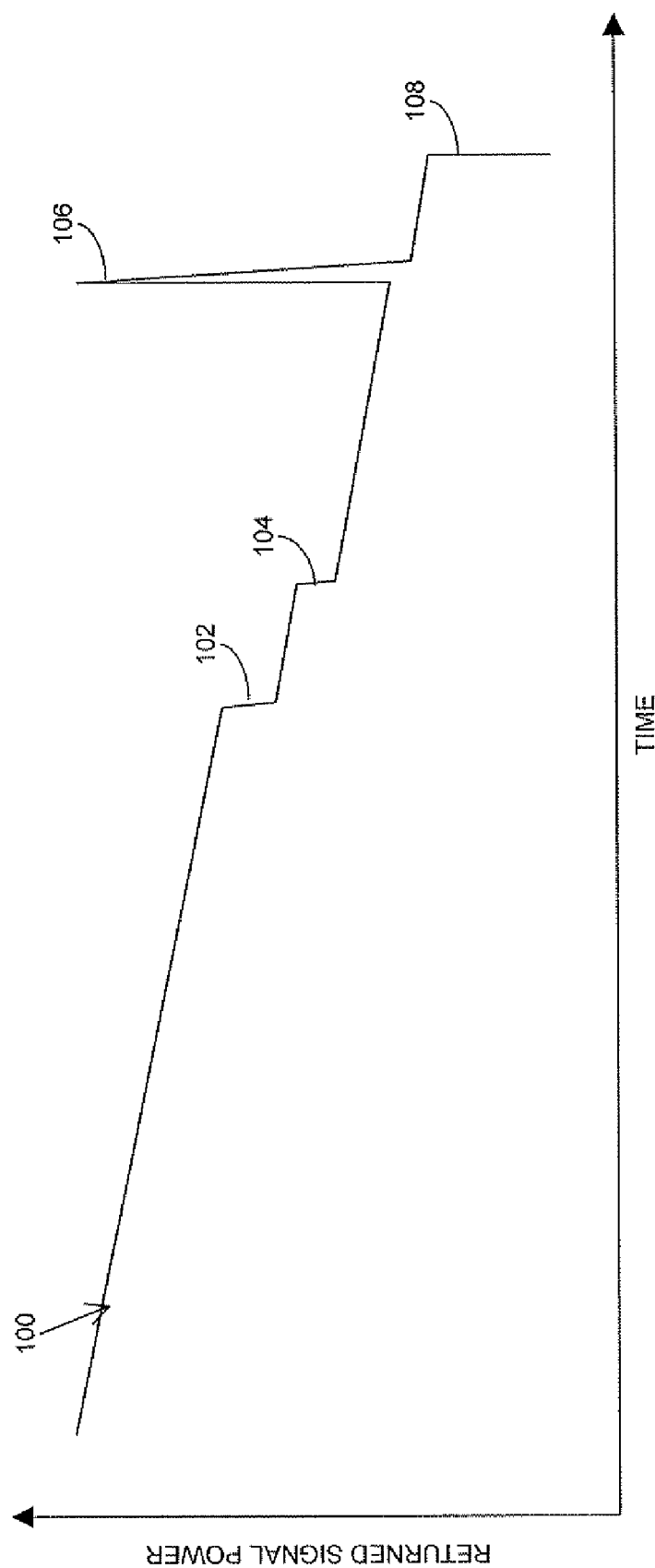
FIG. 1 shows an example of an OTDR diagram of the power of a returned signal over time.

The principles and operation of the system and method according to the present embodiment may be better understood with reference to the drawings and the accompanying description. The present embodiment is a system for performing analysis of links, in particular optical time domain reflectometry (OTDR) of PONs. The system and method facilitate testing of links more frequently, while maintaining service for users, and at a lower cost than conventional solutions.

In one embodiment, an OTDR test uses a network's communication protocols with the data signal transmission wavelength to perform OTDR testing on a link, referred to as in-band OTDR testing. In other words, an OTDR signal (probe pulse) is handled by the network's communication protocol like a network data signal. A network device is typically operationally connected to at least one user device via a link. When an OTDR measurement is to be performed, the network device notifies the user devices to halt transmission of data signals to a network equipment performing the OTDR testing during a determined test time. In the context of this description, data signals refer to all of the control and information signals sent on a link to provide service to users, as compared to a test signal that is used by a service provider for maintenance of a network. The network equipment is configured with an OTDR transmitter and an OTDR receiver. The determined test time is based on the network's communication protocols. A preferred configuration is where the network equipment's OTDR transmitter and OTDR receiver are included in the network device. The network device actuates the OTDR transmitter to transmit an OTDR signal on the link during the determined test time. The OTDR receiver is operationally connected to the link and configured to receive the OTDR signal. A processing system is operationally connected to the OTDR receiver and configured to process the OTDR signal to provide OTDR test results. In one implementation, the network device transmits the OTDR signal downstream using an upstream wavelength. The reflected OTDR signal is received at the network device while upstream data signals from the ONUs are halted, facilitating in-band OTDR testing. Note that during OTDR testing, data signals can continue to be sent from the network device performing the OTDR test.

Because the in-band OTDR uses a network's communication protocols to perform the OTDR test, the time required for OTDR measurements are typically about the same as the time required for other global network events, and in the art is not considered an interruption of service to users. As a result, in-band OTDR testing maintains service to users and is readily available, facilitating more frequent testing of a link, as compared to conventional OTDR testing that uses the data signal transmission wavelength, which disrupts service to users and hence is typically performed as infrequently as possible. Because the OTDR testing is performed using the data signal transmission wavelength and in-band signals, relatively cheaper components can be used, as compared to out-of-band OTDR that uses relatively more expensive components. Additionally, the OTDR components can be integrated into the networking device and use the same receiving front end that is typically less expensive as compared to stand-alone OTDR test equipment.

Note that for clarity, this description uses a PON, often referring to only one ONU, but this does not imply that the system and method are limited by the description. PONs typically have a plurality of ONUs and this method can be applied to other network types having similar operational capabilities. Also note that the embodiment has been found to be of utility independent of the accuracy or otherwise of the exemplary apparatus described.

Figure 4:
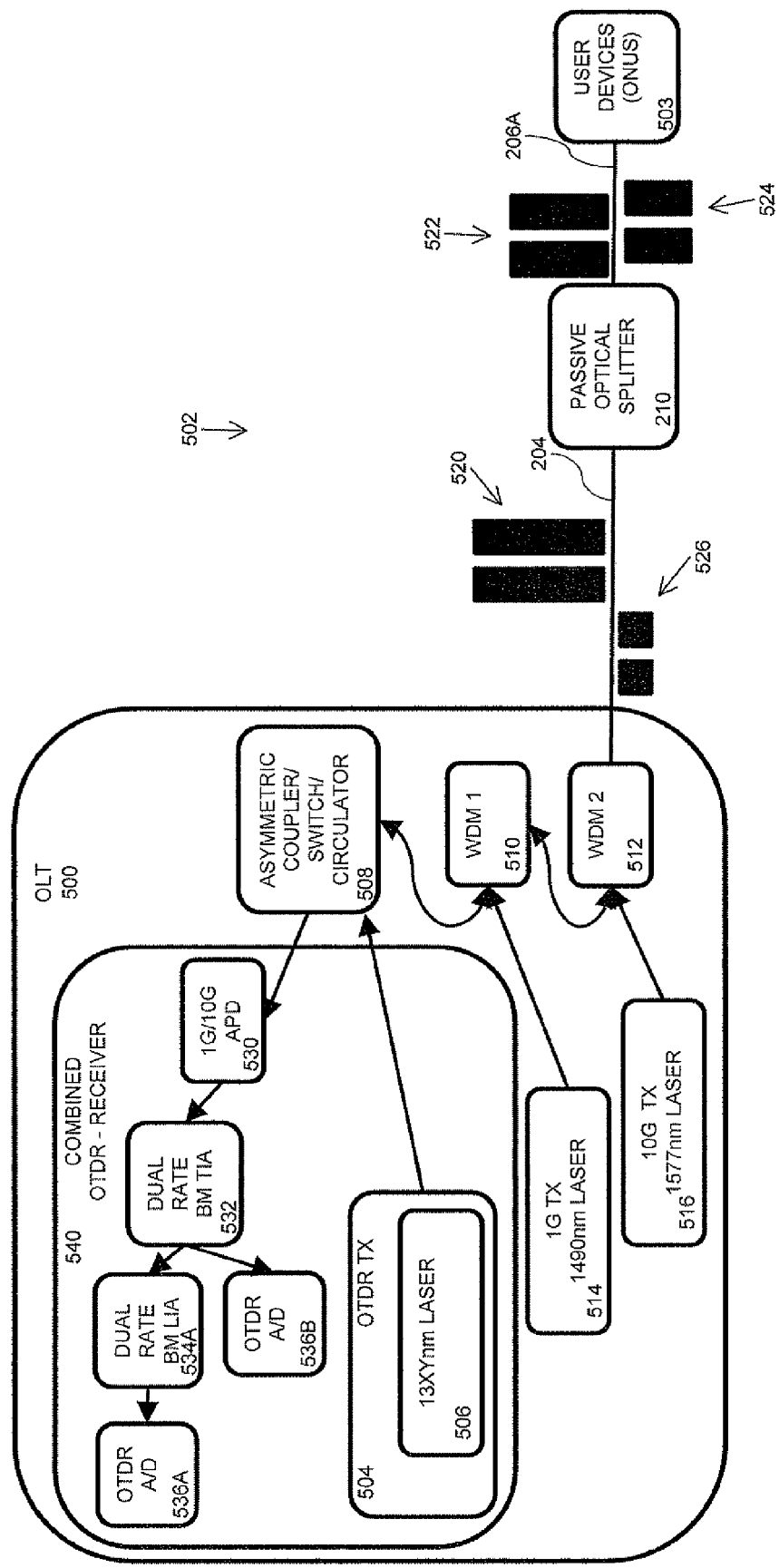
FIG. 4 is a diagram of a system for performing in-band OTDR in a PON.

Referring to FIG. 4, a diagram of a system for performing in-band OTDR in a PON, the network device is an OLT 500 and PON communication protocols are used to allow the OTDR to be performed. The link to be tested is shown as 502, which is also known as the link under test (LUT) or in a case where the link is a fiber optic communications link, the link is known as the fiber under test (FUT). The OTDR signal is synchronized with PON upstream transmission using the time division multiplexed (TDM) partition of the upstream path from users. When an OTDR measurement is to be performed, the OLT 500 notifies the ONUs 503 to halt upstream transmission for a determined test time (also known as a time window, in other words at certain time, for a given length of time) required for the OTDR measurement. The determined test time preferably starts after scheduled data signals have been received, and includes any component ramp up/switchover times, the OTDR round trip time (RTT), and any component reset/switch back times. In one embodiment, the determined test time can be predetermined, for example, the determined test time starts at 1:30 AM or in 5 seconds, and lasts for 250 microseconds, which is typically sufficient for a single OTDR testing for a typical 25 km (kilometer) link. In another embodiment, the determined test time can be calculated based on the link. Calculating a determined test time may be preferred in cases where there is a desire to minimize the duration of OTDR testing. Preferably this OTDR measurement and associated time window are repeated a multitude of times and the received OTDR signal is averaged in order to achieve better receiver sensitivity. Signal averaging is described further, below. In this typical case, a single optical pulse for testing is referred to as an OTDR measurement signal, and one or more OTDR measurement signals are sent during a determined test time. The term OTDR signal is a more general term, referring to one or more OTDR measurement signals, or all of the OTDR measurement signals associated with an OTDR test, depending on the context. An OTDR test typically includes repeated testing, for instance every 1 msec or every 200 msec, to provide sufficient received signals to achieve a desired sensitivity. Depending on the application, the total time for an OTDR test can be on the order of tens of seconds, minutes, or hours. Based on this description, one skilled in the art will be able to determine a determined test time for a specific application.

One technique for halting data signal transmission to the network equipment performing the OTDR test, in this case halting upstream transmission, is to send a broadcast message from the OLT 500 to the ONUs 503 requesting that the ONUs do not send any data during the determined test time (the ONUs do not send reports to the OLT requesting allocations). However, this technique requires changing the PON protocol, the OLT, and the ONUs to handle this new broadcast message. A preferred technique is to have the OLT not send MPCP gates in EPON (1G and 10G) or not send GTC allocation (in GPON or NG-GPON) corresponding to the determined test time. This technique is similar to the allocation of a discovery grant in the EPON protocol (1G and 10G) or ranging window in the GTC protocol of the GPON. Using this technique of not sending a user device permission to transmit uses the existing network communications protocol and no changes to user devices are necessary. Note that in the context of this document, notifying user devices to halt transmission of data signals includes a technique such as not sending user devices permission to transmit (for example MPCP gates in EPON or GTC allocations in GPON)

The OLT 500 actuates an OTDR transmitter (OTDR TX) 504 to transmit an OTDR measurement signal on the link during the determined test time. The OTDR transmitter 504 includes a laser operating at the upstream wavelength. In this case, a 13XY laser 506 can be used with a TDM transmitter, similar to an ONU upstream transmitter. Typically, the 13XY laser 506 is a 1310+/−50 nm for a Fabry-Perault 1G EPON type and 1310+/−30 nm for a GPON DFB type. Other lasers can also be used, and based on this description, one skilled in the art will be able to choose a correct laser for an application. During the determined test time, an OTDR signal is transmitted downstream from the OTDR transmitter 504 via an asymmetric coupler 508, WDM 1 510, WDM 2 512, onto link 502. Alternative implementations in place of asymmetric coupler 508 include, but are not limited to, a switch (used to switch to the transmitter during transmit time) or a circulator. Depending on the application, the OLT 500 includes one or more lasers for data signals. A 1490 nm laser 514 is typically used for 1GEPON/GPON transmissions, and can transmit downstream via WDM 1 510 (and subsequently via WDM 2 512). A 1577 nm laser 516 is typically used for 10GEPON/XGPON transmissions, and can transmit downstream via WDM 2 512. During the determined test time when the OTDR signal is being transmitted, the data signal lasers (514, 516) using 15XY wavelength can continue to operate and transmit data signals downstream, as the OTDR test signal at 13XY can be received upstream without interference.

Depending on the application, an OTDR signal can take a variety of forms. One option is to transmit OTDR signal as a pulse or a series of pulses, providing a code like a pseudo-noise (PN) sequence, or a Golay code, to increase the coding gain of the link. Using a pseudo-noise sequence can improve the equivalent transmitted and received power and therefore the sensitivity of the OTDR. These coding methods are known OTDR implementations (known as correlation OTDR). Another option is to configure the pulse size to vary depending on data path sizes, for example using pulses varying between 1 nsec and hundreds of nanoseconds for 1G PON/GPON. Another option is to vary the difference between high resolution measurement in smaller pulse sizes to increase the sensitivity of a high pulse width. A limit to the size of the pulse used is the data receiver high frequency bandwidth (as using the regular data path front end), which should be sufficient for the pulse size used.

A representation of the OTDR downstream signal on the link segment between the OLT 500 and a passive optical splitter 210 is shown as 520. As the OTDR signal travels downstream on the link, the power of the OTDR signal is reduced, as represented by 522. As the OTDR signal returns upstream 524, 526 the power of the OTDR signal continues to be attenuated by the characteristics and events on the link 502. Note that representations 520, 522, 524, and 526 are to help describe the system, are not to scale and do not necessarily represent the shape of an actual OTDR signal.

An in-band OTDR receiver is operationally connected to the link and configured to receive the returned OTDR signal. Because the returned OTDR signal is received is at the upstream wavelength, in this case 13XY, the same receive path used for receiving data signals can be used to receive the returned OTDR signal. The received OTDR signal from link 502 is received via WDM 2 512, WDM 1 510, and asymmetric coupler 508 (or switch or circulator, as described above) at an avalanche photodiode (APD) 530. Note that although an APD is used in this description, other components such as a PIN photodiode can be used. Then the received OTDR signal is amplified through a dual rate (both 1G and 10G) burst mode trans-impedance amplifier (BM TIA) 532. In one option, from the BM TIA 532 the signal (amplified received OTDR signal) goes through a dual rate (both 1G and 10G) burst mode limiting amplifier (BM LIA) 534A and then sent to an OTDR analog to digital converter (A/D) 536A. In another option, from the BM TIA 532 the signal is sent to an OTDR A/D 536B. A/D (536A or 536B) is operationally connected to a processing system (not shown) configured to process the OTDR signal to provide OTDR test results.

The received OTDR signal that arrives via the regular OLT receive path typically arrives below the noise level of a regular received data signal. The received OTDR signal is measured along with associated noise sources, and can be processed with analog techniques such as signal averaging. With a sufficient number of samples, or correspondingly with a sufficient integration time, signal averaging can measure and extract a signal even in the presence of noise that is greater than the received signal power. Signal averaging is a known technique that is used in OTDRs. The sampling (analog to digital conversion) of the received OTDR signal can be done after the dual rate BM TIA 532 by OTDR A/D 536B, or after LIA 534A by OTDR A/D 536B, as described above. Advantages of sampling before the LIA 534 include avoiding the non-linear clipping behavior of the LIA and in some cases the excessive amplification of noise by the LIA. In a case where sampling is implemented after the LIA 534, the signal squelching functionality of the LIA is disabled.

The process of transmitting the OTDR measurement signal can be repeated for the required integration time to reach the required sensitivity. The averaging parameter can be configured according to the required performance and the integration time. The sampled received OTDR signal can be sent to a processing system (not shown in FIG. 4) for further processing including, but not limited to, digital match filtering, additional averaging, and measurement analysis. Note that during this averaging, the OLT may cycle between sending OTDR signals (halting upstream ONU transmissions) and allowing ONUs to send data upstream in order to maintain a level of service to users. The amount of bandwidth (length and number of time windows) taken from the upstream data path is an operational decision and can be defined according to the status of the link. In a non-limiting example, if there is a problem with a link, more bandwidth can be taken from the upstream data path to facilitate performing OTDR testing quickly. In another non-limiting example, periodic monitoring of the status of a link can use minimal bandwidth with an associated time required to perform OTDR testing.

Because the OTDR testing is performed using in-band signals, relatively cheaper components (particularly 13XY optical transmitters and receivers) can be used, as compared to out-of-band OTDR that uses relatively more expensive 16XY components. Multiplexing of an in-band signal (such as a 13XY nm laser transmission) can add additional loss in the signal path.

Note that although a network device is typically operationally connected to at least one user device via a link, the current embodiment facilitates OTDR testing when only a network device is active on a link (in the case where the OTDR transmitter and OTDR receiver are in the network device). One non-limiting example is when a link is being brought up, and testing is performed before user devices are active on the link. Another non-limiting example is when an OLT loses communications with the user devices, for instance from a power failure at the user facility, and the network device performs an OTDR test to determine if the communications problem is due to the link.

Figure 3:
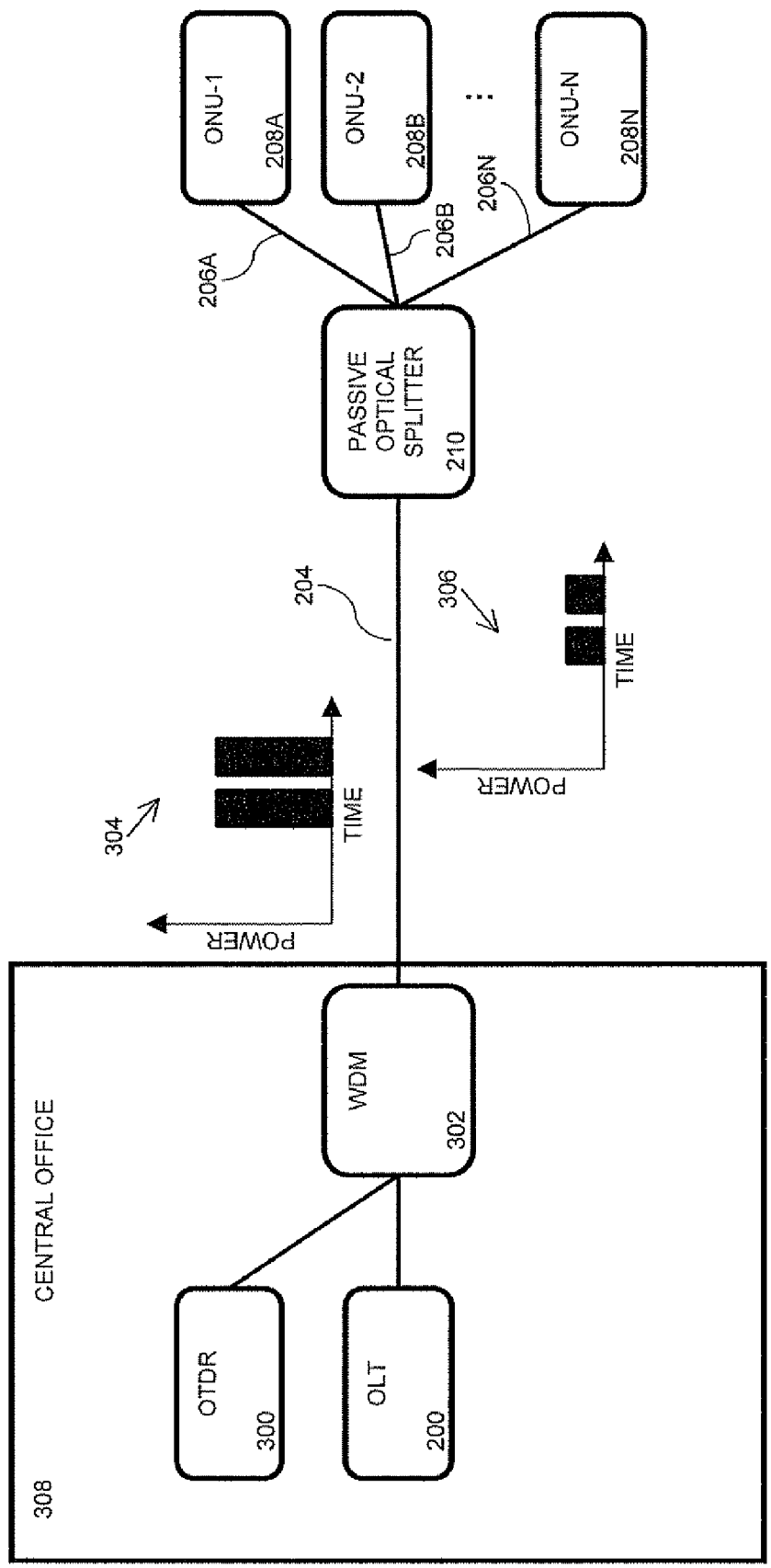
FIG. 3 shows a conventional out-of-band OTDR system.

In FIG. 4, the in-band OTDR transmitter and OTDR receiver are integrated into the OLT, shown as combined OTDR-receiver 540, sharing the regular OLT receive path. In another implementation, the in-band OTDR test equipment, which includes OTDR transmitter and OTDR receiver, can be stand-alone from the OLT, similar in architecture to the out-of-band OTDR shown in FIG. 3. In this case, additional control and communications are needed between the OLT and the stand-alone in-band OTDR to facilitate OTDR testing while maintaining service to users, as described above.

Figure 2:
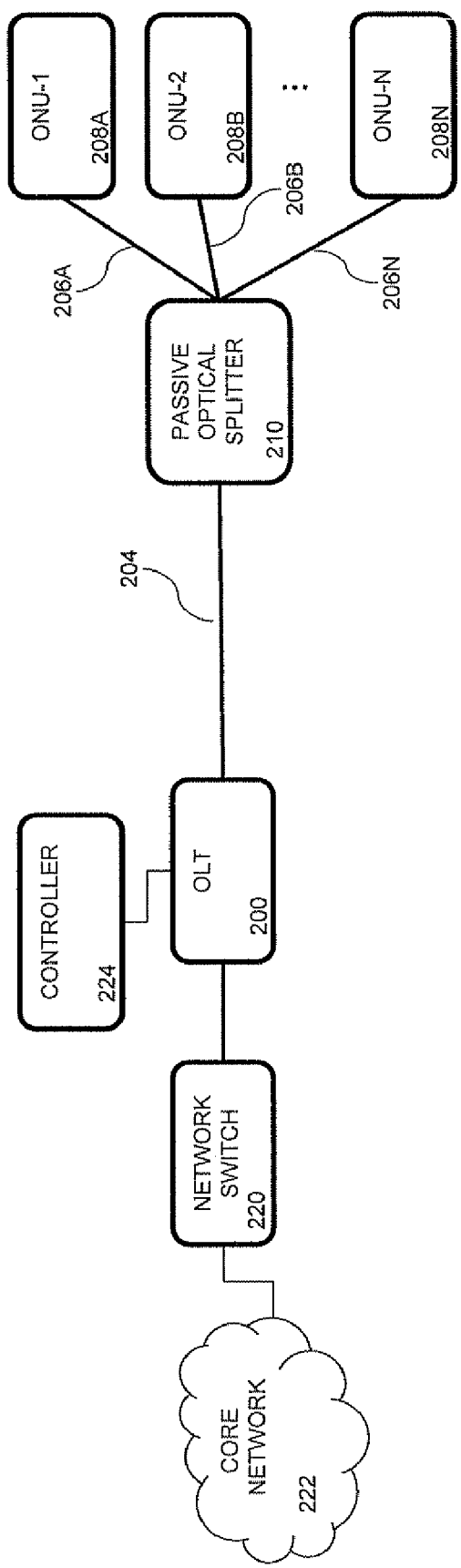
FIG. 2, a diagram of an EPON network.

Referring back to FIG. 2, in an optional implementation OTDR testing can be initiated by a controller 224. OTDR testing can be manually initiated, automatically initiated based on a pre-determined schedule, and/or based on operational parameters of the network. In a case where a technician travels to a point in a network to perform in situ diagnostics, the technician can manually initiate the desired OTDR testing.

Figure 7:
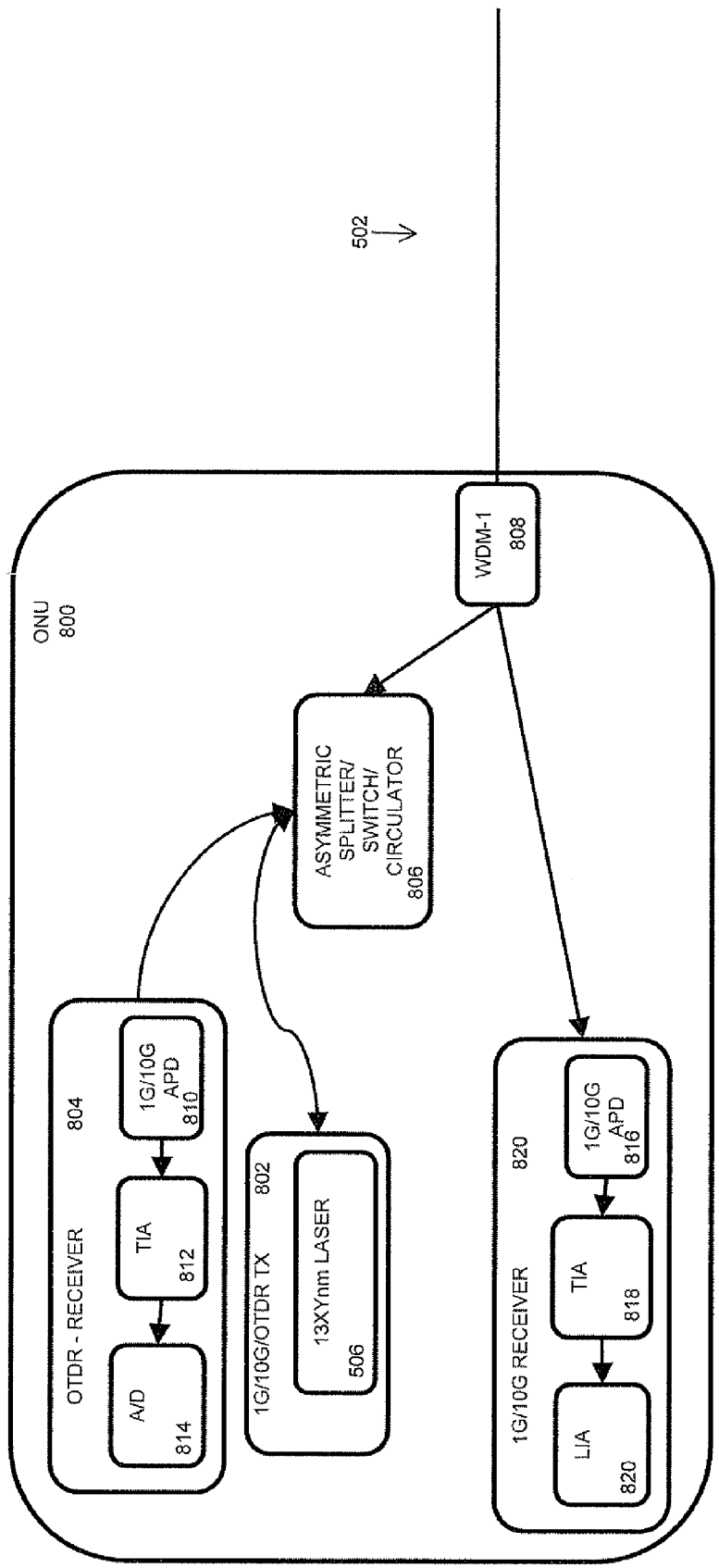
FIG. 7 is a diagram of a system for performing in-band OTDR in a user device.

Referring to FIG. 7, a diagram of a system for performing in-band OTDR in a user device is similar in function to the system described in reference to FIG. 4. In this implementation, the in-band OTDR can be integrated into a user device, which in the case of PONs is an ONU 800. The network equipment containing an OTDR transmitter and an OTDR receiver is included in the user device. The PON communication protocols are used to allow the OTDR to be performed, as described above. In one implementation, OTDR testing can be initiated by an OLT. In this case, the OLT sends a message to an ONU telling the ONU at what determined test time the ONU should perform the test. The OLT halts network transmission during the determined test time and OTDR testing is performed, including notifying the user devices to halt transmission of data signals during the determined test time. In another implementation, OTDR testing can be initiated by an ONU. In this case, the ONU sends a message to the OLT requesting a test to be performed. The OLT responds as previously described for an OLT initiated test. In a case where there is no response from the OLT, depending on the application, the ONU can decide to initiate OTDR testing from the ONU. In the case of ONU-initiated OTDR testing, the determined test time for the OTDR test is calculated based on the appropriate round trip time (RTT) between the network device and user devices. It is recommended that applications involving ONU initiated transmission be managed carefully in a very safe manner to make sure that the ONU does not interfere with operation of the network.

Various configurations of OTDR transmitter 802, laser 506, OTDR receiver 804, and 1G/10G receiver 820 can be used depending on the application. In one implementation, a 15XY laser (normally used, for downstream transmission) is added to the ONU (in addition to a 13XY laser normally used for transmitting upstream). The 15XY laser transmits an OTDR signal that is received by the existing 15XY receiver in the ONU. During OTDR testing, 15XY data signals from the OLT to the ONUs are halted. During the determined test time when the OTDR signal is being transmitted, the data signal lasers in ONUs using 13XY wavelength can continue to operate and transmit data signals upstream, as the OTDR test signal at 15XY. Appropriate attention should be paid so as to not interfere with the data signal transmissions of other ONUs, including, but not limited to synchronization at the ONUs.

In another implementation, an ONU uses an existing upstream 13XY laser 506 to transmit an OTDR signal. In this case, the OTDR signal transmitted by the ONU does not interfere with the data path, as the OTDR signal is aligned with the network's communication protocol as previously described. The reflected signal is received in the ONU via WDM-1 808 and an asymmetric splitter, switch, or circulator 806 by a 13XY OTDR receiver 804. Because the received OTDR signal is in different wavelength than the received data signal (13XY verses 15XY, respectively), the received OTDR signal does not interrupt downstream transmission. OTDR processing is known in the art and typically includes an appropriate APD 810, TIA 812, and A/D 814. Normal data signals, which in the case of PON are downstream 15XY nm, are received by an appropriate 1G/10G receiver 820, and known processing includes an appropriate APD 816, TIA 818, and LIA 820. Optionally a different receive path can be used for the ONU to receive the reflected 13XY OTDR signal. In another implementation, the reflected upstream 13XY signal is received at the ONU using a back-facet monitor (BFM).

A BFM can be implemented by a photodiode connected to the laser transmitter. The photodiode can be kept sub-threshold and the reflected OTDR signal can be amplified by the laser below threshold and appear at the BFM, providing an OTDR receiver. In this case, the BFM needs to be fast enough to match the bandwidth of the optical pulses used for OTDR measurement signals. Typically, the BFM is used to measure average power only and can have low bandwidth compared to other system components. Note that this BFM technique can also be used in an OLT to amplify a downstream 15XY OTDR signal that is reflected and received at the OLT, providing an OTDR receiver.

One method of transmitting an OTDR signal is to inject the signal using a circulator. This loss from using a circulator is typically about 1 dB, and circulators are hard to integrate, as compared with using an optical switch. Another method of transmitting an OTDR signal is to inject the signal using an optical switch (generally referred to a simply a "switch") that is switched to the transmitter only during the transmitter transmit time. The loss from using an optical switch is typically about 0.5 dB. When using an optical switch, switching times should be considered in regard to receiving a reflected OTDR signal. An optical switch can be integrated in the optical component, and provides a less expensive solution (than integrating a device such as a circulator), and reducing loss (from that of using a circulator) to about 0.5 dB.

As described above, the sensitivity level for the data path is typically about −30 dBm, while the increased sensitivity level for the OTDR is typically in the range of −75 dBm to −105 dBm, which for simplicity is referred to in the art as −90 dBm. For typical OTDR testing, an OTDR receiver needs to be implemented with this increased sensitivity. Based on this description, one skilled in the art will be able to design an OTDR receiver for an ONU that is appropriate for the application.

In another implementation, an ONU can be designed to only to be used for OTDR testing of the respective arm of the PON on which the ONU is located. In this case, the typical loss can be much lower than the loss when performing OTDR testing on an entire link. One implementation option is to provide an OTDR path using an asymmetric splitter on the data path, which only adds a small amount (less than 1 dB) of attenuation, providing a low-cost coupling solution for the ONU. Using a normal data signal receiver further reduces the costs of implementing an OTDR function in an ONU, as compared with adding special OTDR receiver hardware to the ONU. In general, the ONU is cost-sensitive equipment, so low-cost integration solutions are an important consideration. Aspects of the current embodiment facilitate component re-use and low-cost integration of additional capabilities in an ONU (such as using the existing data signal transmitters and possibly receivers).

Communications between an OLT and ONUs can be via the normal data signals of the communications protocol or via an innovative use of the OTDR signal for data communications. In a case where the OTDR test results are on a first network equipment, the OTDR test results can be transmitted via the link using the data signals to a second network equipment. In a case where there is a problem with a link, the signal loss can exceed the sensitivity of a normal data signal receiver (−30 dBm), so that network equipments cannot communicate using the normal data signal receivers. In this case, OTDR testing can be initiated using the OTDR signal path, in other words, using the more sensitive OTDR receivers to receive requests to initiate OTDR testing (for example at an OLT) and/or receive commands to initiate OTDR testing (for example at ONUs). Therefore, if there are degradations in a link which require an OTDR function an OTDR signal may still be able to be communicated, while normal data signals will not be able to be communicated. In this case, where communications are transmitted via a link using an OTDR transmitter and received using an OTDR receiver, each network equipment that is part of the communications must be configured with the appropriate OTDR components. In other words, the network is configured with at least two network equipments able to perform OTDR testing.

In a non-limiting example, a PON includes an OLT and one or more ONUs configured for in-band OTDR testing. An event occurs on an arm causing sufficient signal loss that OTDR testing cannot be successfully performed by the OLT. The OLT signals the ONU on the arm to perform an OTDR test. After the ONU has OTDR test results, the ONU transmits the OTDR test results via the impaired link using the OTDR path to the OLT, where the OTDR test results can then be transferred to a centrally located controller for further action.

In an optional implementation, an OTDR signal is constructed of a series of spreading sequences and a different spreading sequence is used to signal each ONU to initiate ONU OTDR testing.

Figure 5A:
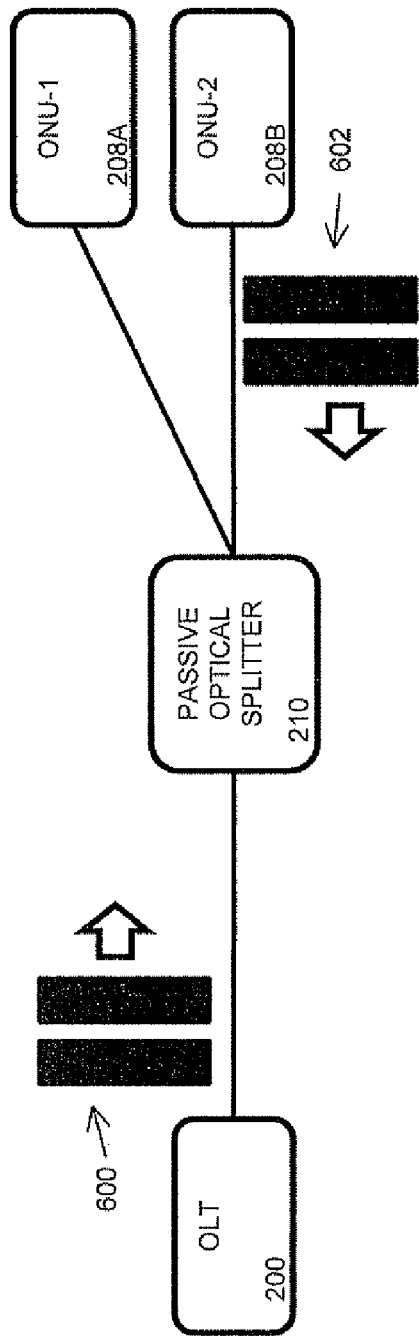
FIG. 5A is a diagram providing a heuristic example of standard operation.
Figure 5B:
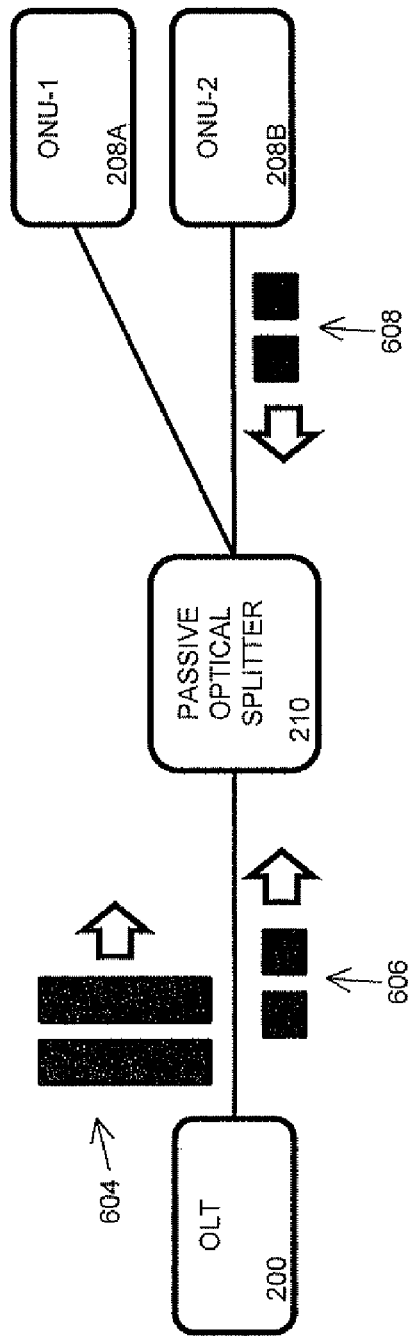
FIG. 5B is a diagram providing a heuristic example of an active reflection at the ONU.

OTDR test data can be communicated between network equipment using normal data signals and associated communication protocols, or using the OTDR signal path. Using the OTDR signal path facilitates an ONU sending testing data across a degraded link. This implementation can be helpful when test data needs to be sent to a central monitoring facility associated with an OLT. OTDR test data can be stored at an ONU and then transmitted to an OLT as a pre-determined time, based on a state such as end of testing, and/or when communications resources are available. One method of sending OTDR test data includes modulating an OTDR signal transmitted from an ONU for receiving at an OLT. Modulation provides a low bandwidth transmission path, as compared to normal data signal communication, which allows sensitive receiving of the modulated OTDR. This method acts as an active reflection provided by the ONU. Referring to FIG. 5A, a diagram providing a heuristic example of standard operation, an OLT 200 transmits a normal 15XY (1490/1577 nm) signal 600 to ONU-2 208B requesting ONU-2 to send OTDR test data. ONU-2 208B responds by sending a standard data signal 602 to the OLT 200. Referring to FIG. 5B, a diagram providing a heuristic example of an active reflection at the ONU, the OLT 200 transmits normal data signals 604 (15XY-1490/1577 nm) to the ONUs. The OLT 200 also transmits a special OTDR-like 1310/1490 nm signal 606 to ONU-2 208B requesting ONU-2 to send OTDR test data. ONU-2 208B responds by sending a special OTDR-like signal 608 to the OLT 200. Other techniques for communicating OTDR test data, such as sideband communications, are known in the art.

Figure 6:
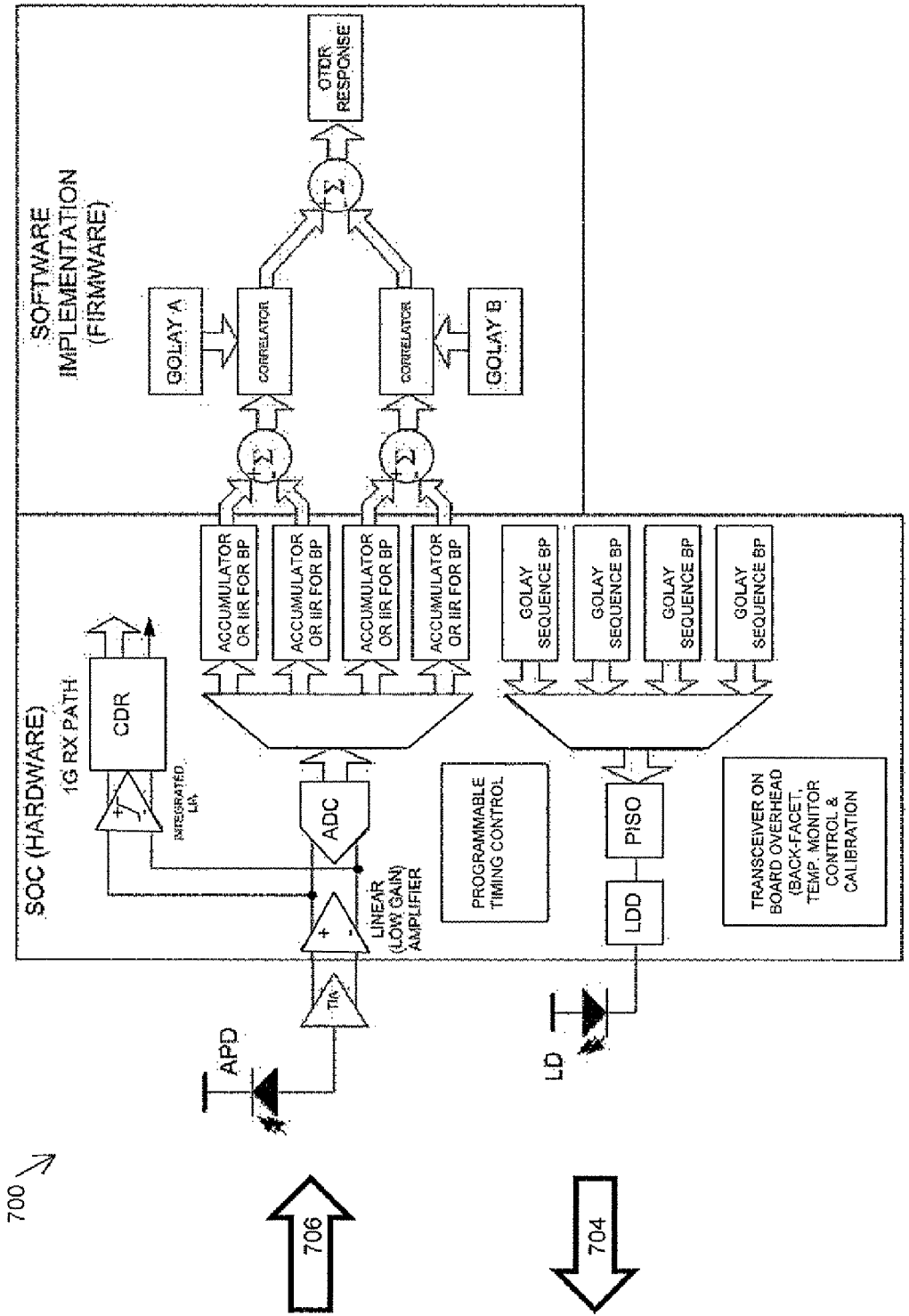
FIG. 6 is a schematic diagram of one exemplary implementation of an apparatus for in-band OTDR function.

Referring now to FIG. 6, a schematic diagram of one exemplary implementation of an apparatus for in-band OTDR function includes a front head optical interface 700 for a combined OTDR signal and data signal interface, as described above in reference to FIG. 4. This apparatus also provides a receive path and system functionality for implementing in-band OTDR. Note that this is an exemplary implementation, and the above-described embodiment has been found to be of utility independent of the accuracy or otherwise of this apparatus.

In the front head optical interface 700 an OTDR signal is added into the link using a component such as an isolator/circulator, a passive coupler/splitter, or are optical switch. This integrated solution implementation facilitates adding OTDR signal transmission at a low cost, as compared to adding OTDR signal transmission as a stand-alone component. As described above, upstream transmissions are halted during a determined test time for OTDR testing, during which the OTDR transmitter transmits an in-band OTDR signal. In a case where the front head optical interface 700 is located in an OLT, a 13XY nm OTDR signal is launched downstream, shown as arrow 704.

A returned OTDR signal, shown as arrow 706, can be received using an existing receiver, for example, the existing 13XY nm upstream avalanche photodiode (APD), to detect the return light. In the receive side, the OTDR signal comes in-band, in the same data path but separated in time (TDM) from the data signal. The network equipment, such as user devices, for example ONUs, can be seen through passive reflection of the reflected OTDR signal—using the fiber/air reflection that exists when a network equipment has been disconnected from the link, or when a fiber has been cut, or using the reflectivity of a network equipment connected to the link. The percentage of reflection is variable, low, and not fully guaranteed in the transceiver (TRX) datasheets as a minimal value, as the transceiver data sheets typically only specify a maximal value allowed for interference. However, the value of the percentage of reflection should be stable and consistent for a network equipment so the variation of the OTDR signal level from a reflection from a network equipment can be detected and use off-the-shelf optics can be used to reduce the cost of the front head optical interface 700. Another option is to correlate pulse reflections with ONU identification, using knowledge of timing derived from PON timing protocols.

In the transmit side the transmitted OTDR signal is added to the data signal data path (not shown) through an isolator/circulator, or a passive coupler/splitter, or an optical switch. The transmit path of the OTDR signal contains an alternate transmit of the 4 phases of the Golay sequences through a parallel to serial engine into the laser driver modulation. OTDR signal(s), such as Golay sequences, are typically transmitted at the beginning of the OTDR transmission time window.

In the receive side the data signal is processed by a limiting amplifier (LIA) and then to a CDR (clock data recovery)/SERDES (serializer/de-serializer) for regular data path. The received OTDR signal either goes directly to an A/D or goes to an A/D after an LIA. Data signal processing includes accumulating the sampled signal for averaging and passing the signal through a low pass filter, such as an IIR filter. In the case where a Golay sequence is used for the OTDR signal, the Golay code is typically constructed from 4 phases of series providing negative and positive sequences, having averaging and filtering for each sequence, as is known in the art. Then the polarity is summed and a Golay correlation function is done to correlate the peak pulse of the sequence and get the coding gain out of the code, providing the OTDR response. Golay pairs are bipolar codes, meaning having values of +1 and −1. Because in present PON non-coherent signaling is used, there is no phase information. One implementation method is to transmit true and complement versions (that contain only 0 and 1, corresponding to dark and light) of each Golay pair and subtract the Golay pairs to build the bipolar code.

Based on this description, one skilled in the art will be able to implement an apparatus for in-band OTDR function at a network device or a user device.

Referring to FIG. 8 is a diagram of an OLT 900 (more generally a network device) with an integrated out-of-band OTDR. As described above, an out-of-band OTDR uses an OTDR wavelength that is different from the wavelength used for data signals, so an OTDR can be performed without interruption to user services. This feature allows an out-of-band OTDR to perform more averaging that in-band OTDR, facilitating a higher sensitivity or a reduction in the measurement time to reach a certain level of sensitivity.

In the case of PON, typically 16XY nm is used for out-of-band OTDR. A 16XY laser 906 transmits an OTDR signal via an asymmetric coupler 508 (or switch or circulator, as described above) at and WDM-4 950 downstream on link 502. The returned OTDR signal is received via the reverse path to an OTDR receiver 936. Normal data signals are received by receiver 940.

This implementation facilitates a higher degree of component integration, as compared to conventional out-of-band systems using stand-alone components. One non-limiting example of component integration is implementing the WDM in a quadplexer (shown as WDM-4 950), as opposed to cascading diplexers (refer back to FIG. 4, 510 and 512, which can be implemented in the optical transceiver head, reducing the cost of the system and reducing the attenuation of conventional OTDR integrations. Working in the 16XY nm range makes the link budget easier and this wavelength is more sensitive to the bends in a fiber optic link, so the reflected signal and changes in backscatter are more significant than OTDR using 13XY nm.

As described above, an optional technique is to connect 16XY nm reflectors are at the user devices (ONUS) to reflect an OTDR signal and allow the arms of the link to each ONU to be seen.

It will be appreciated that the above descriptions are intended only to serve as examples, and that many other embodiments are possible within the scope of the present invention as defined in the appended claims.

What is claimed is:

1. A system comprising:
   (a) a network equipment including:
      (i) an optical time domain reflectometry (OTDR) transmitter operationally connected to a link and configured to transmit an OTDR signal at a first wavelength, and
      (ii) an OTDR receiver operationally connected to the link, configured to receive said OTDR signal at said first wavelength;
   (b) a network device operationally connected to the link, said network device configured to transmit data signals at a second wavelength and receive data signals at said first wavelength, said network device configured to actuate said OTDR transmitter to transmit said OTDR signal on the link during a determined test time, said determined test time based on a communications protocol of the link, wherein during said determined test time data signals are not transmitted to said network device at said first wavelength, and wherein said network device is allowed to transmit said data signals during said determined test time at said second wavelength; and
   (c) a processing system operationally connected to said OTDR receiver, said processing system being configured to process said OTDR signal to provide OTDR test results.

2. The system of claim 1 wherein said network equipment is included in said network device.

3. The system of claim 1 wherein said network device is an optical line transmission equipment (OLT).

4. The system of claim 3 wherein said network equipment is included in said OLT and said OTDR transmitter is configured for transmitting downstream an OTDR test signal wherein said first wavelength is 13XY nanometers (nm).

5. The system of claim 1 wherein said determined test time is calculated based on the link.

6. The system of claim 1 including at least one user device operationally connected to the link.

7. The system of claim 6 wherein said network equipment is included in at least one said at least one user device.

8. The system of claim 7 wherein said OTDR test results are transmitted via the link using said data signals.

9. The system of claim 7 wherein said network equipment is included in said network device and wherein said OTDR test results are transmitted via the link using said OTDR transmitter in said user device and received using said OTDR receiver in said network device.

10. The system of claim 7 wherein said network equipment is included in said network device and wherein said OTDR test results are transmitted via the link using said OTDR transmitter in said network device and received using said OTDR receiver in said user device.

11. The system of claim 6 wherein said test time is calculated based on a round trip time (RTT) between said network device and said at least one user device.

12. The system of claim 6 wherein said network equipment is included in a stand-alone OTDR test equipment separate from said network device and from said at least one user device.

13. The system of claim 6 wherein at least one of said at least one user device is configured to notify said network device to actuate said OTDR transmitter to transmit said OTDR signal on the link during said determined test time.

14. The system of claim 6 wherein at least one of said at least one user device is configured to actuate said OTDR transmitter to transmit said OTDR signal on the link during said determined test time.

15. The system of claim 6 wherein said at least one user device is an optical networking unit (ONU).

16. The system of claim 15 wherein said network equipment is included in said ONU and said OTDR transmitter configured for transmitting upstream an OTDR test signal wherein said first wavelength is 15XY nm.

17. The system of claim 1 wherein the link is a fiber optic communications link.

18. The system of claim 1 wherein the link is configured for a passive optical network (PON).

19. The system of claim 1 wherein said OTDR signal is an in-band signal.

20. A system comprising:
(a) a network equipment including:
(i) an optical time domain reflectometry (OTDR) transmitter operationally connected to a link and configured to transmit an OTDR signal at a first wavelength, and
(ii) an OTDR receiver operationally connected to the link, configured to receive said OTDR signal at said first wavelength;
(b) a network device operationally connected to the link, said network device configured to transmit data signals at a second wavelength and receive data signals at said first wavelength, said network device configured to actuate said OTDR transmitter to transmit said OTDR signal on the link during a determined test time, said determined test time based on a communications protocol of the link, wherein during said determined test time data signals are not transmitted to said network equipment at said first wavelength, and wherein said network device is allowed to transmit said data signals during said determined test time at said second wavelength;
(c) at least one user device configured to transmit said data signals at said second wavelength and receive data signals at said first wavelength, said at least one user device is allowed to transmit data signals at said second wavelength during said determined test time, said at least one user device operationally connected to the link; and
(d) a processing system operationally connected to said OTDR receiver, said processing system being configured to process said OTDR signal to provide OTDR test results.

21. A method comprising the steps of:
(a) actuating an optical time domain reflectometry (OTDR) transmitter in a network equipment to transmit an OTDR signal at a first wavelength during a determined test time on a link operationally connected to said OTDR transmitter, said determined test time based on a communications protocol of the link, wherein during said determined test time data signals are not transmitted to said network equipment at said first wavelength, and wherein a network device operationally connected to the link is configured to transmit data signals at a second wavelength and received data signals at said first wavelength, and wherein said network device is allowed to transmit said data signals at said second wavelength during said determined test time;
(b) receiving said OTDR signal at said first wavelength with an OTDR receiver in said network equipment, said OTDR receiver operationally connected to the link; and
(c) processing the received OTDR signal with a processing system operationally connected to said OTDR receiver to provide OTDR test results.

22. The method of claim 21 wherein said network equipment is included in said network device.

23. The method of claim 21 wherein said network device is an optical line transmission equipment (OLT).

24. The method of claim 23 wherein said network equipment is included in said OLT and said OTDR transmitter is configured for transmitting downstream an OTDR test signal wherein said first wavelength is 13XY nm.

25. The method of claim 21 wherein said determined test time is calculated based on the link.

26. The method of claim 21 including at least one user device operationally connected to the link.

27. The method of claim 26 wherein said network equipment is included in at least one said at least one user device.

28. The method of claim 27 wherein said OTDR test results are transmitted via the link using said data signals.

29. The method of claim 27 wherein said network equipment is included in said network device and wherein said OTDR test results are transmitted via the link using said OTDR transmitter in said user device and received using said OTDR receiver in said network device.

30. The method of claim 27 wherein said network equipment is included in said network device and wherein said OTDR test results are transmitted via the link using said OTDR transmitter in said network device and received using said OTDR receiver in said user device.

31. The method of claim 26 wherein said test time is calculated based on a round trip time (RTT) between said network device and said at least one user device.

32. The method of claim 26 wherein said network equipment is included in a stand-alone OTDR test equipment separate from said network device and from said at least one user device.

33. The method of claim 26 wherein at least one of said at least one user device is configured to notify said network device to actuate said OTDR transmitter to transmit said OTDR signal on the link during said determined test time.

34. The method of claim 26 wherein at least one of said at least one user device is configured to actuate said OTDR transmitter to transmit said OTDR signal on the link during said determined test time.

35. The method of claim 26 wherein said at least one user device is an optical networking unit (ONU).

36. The method of claim 35 wherein said network equipment is included in said ONU and said OTDR transmitter configured for transmitting upstream an OTDR test signal wherein said first wavelength is 15XY nm.

37. The method of claim 21 wherein the link is a fiber optic communications link.

38. The method of claim 21 wherein the link is configured for a passive optical network (PON).

39. The method of claim 21 wherein said OTDR signal is an in-band signal.

40. A method comprising the steps of:
(a) actuating an optical time domain reflectometry (OTDR) transmitter in a network equipment to transmit an OTDR signal at a first wavelength during a determined test time on a link operationally connected to said OTDR transmitter, said determined test time based on a communications protocol of the link, wherein during said determined test time data signals are not transmitted to said network equipment at said first wavelength, wherein at least one user device is configured to transmit data signals at a second wavelength and receive data signals at said first wavelength, and wherein said at least one user device is allowed to transmit said data signals at said second wavelength during said determined test time, said at least one user device operationally connected to the link;
(b) receiving said OTDR signal with an OTDR receiver in said network equipment, said OTDR receiver operationally connected to the link; and
(c) processing the received OTDR signal with a processing system operationally connected to said OTDR receiver to provide OTDR test results.

41. A system comprising:
(a) at least one user device;
(b) a link operationally connected to said at least one user device;
(c) a network device operationally connected to said link, said network device including:
(i) an optical time domain reflectometry (OTDR) transmitter operationally connected to said link and configured to transmit an OTDR signal at a first wavelength, and
(ii) an OTDR receiver operationally connected to the link, configured to receive said OTDR signal at said first wavelength;
said network device configured to actuate said OTDR transmitter to transmit said OTDR signal at said first wavelength on said link during a determined test time, said determined test time based on said network device withholding permission-to-transmit data signals at said first wavelength from said at least one user device to said network device, and wherein said network device is allowed to transmit said data signals during said determined test time at a second wavelength; and
(d) a processing system operationally connected to said OTDR receiver, said processing system being configured to process said OTDR signal to provide OTDR test results.

42. The system of claim 41 wherein said network device is an optical line transmission equipment (OLT) and said OTDR transmitter is configured for transmitting downstream a 13XY nm OTDR test signal.

43. A method comprising the steps of:
(a) actuating an optical time domain reflectometry (OTDR) transmitter in a network device to transmit an OTDR signal at a first wavelength during a determined test time on a link operationally connected to said OTDR transmitter, said determined test time based on withholding permission-to-transmit data signals at said first wavelength from at least one user device to said network device, wherein said user device is operationally connected to the link and said user device is configured to transmit data signals at said first wavelength and received data signals at a second wavelength, and wherein said network device is allowed to transmit said data signals at said second wavelength during said determined test time;
(b) receiving said OTDR signal at said first wavelength with an OTDR receiver in said network device, said OTDR receiver operationally connected to the link; and
(c) processing the received OTDR signal with a processing system operationally connected to said OTDR receiver to provide OTDR test results.

44. The method of claim 43 wherein said network device is an optical line transmission equipment (OLT), said user device is an optical networking unit (ONU), and said OTDR transmitter is configured for transmitting upstream a 15XY nm OTDR test signal.

45. The method of claim 44 wherein said network equipment is included in said OLT, said OLT includes a receiving front end, and both said OTDR receiver and said OLT receive said first wavelength using said receiving front end.

46. The method of claim 45 wherein said receiving front end can be used for receiving either said OTDR signal or receiving data signals from one or more user devices operationally connected to the link.

47. The method of claim 46 wherein a decision to use said receiving front end for receiving either said OTDR signal or receiving data signals from said one or more user devices is based on respective transmission allocations for said one or more user devices.

48. The method of claim 45 wherein said determined test time is calculated such that said OTDR test signal is received by said OLT at a time other than when said OLT is receiving data signals from said one or more user devices.

49. The method of claim 48 wherein said OLT withholds permission-to-transmit from said one or more user devices during said determined test time.

50. The method of claim 43 wherein said first wavelength is substantially in the range of 1260 nm to 1360 nm and said second wavelength is substantially in the range of 1480 mm to 1580 nm.

* * * * *